(12) United States Patent
Fort et al.

(10) Patent No.: US 8,261,087 B2
(45) Date of Patent: Sep. 4, 2012

(54) DIGIPASS FOR WEB-FUNCTIONAL DESCRIPTION

(75) Inventors: Nicolas Fort, Bordeaux (FR); Benoit Grangé, Bordeaux (FR)

(73) Assignee: Vasco Data Security, Inc., Oakbrook Terrace, IL (US)

(*) Notice: Subject to any disclaimer, the term of this patent is extended or adjusted under 35 U.S.C. 154(b) by 870 days.

(21) Appl. No.: 12/282,269

(22) PCT Filed: Mar. 9, 2006

(86) PCT No.: PCT/US2006/008439
§ 371 (c)(1),
(2), (4) Date: Nov. 19, 2008

(87) PCT Pub. No.: WO2007/102823
PCT Pub. Date: Sep. 13, 2007

(65) Prior Publication Data
US 2011/0314290 A1    Dec. 22, 2011

(51) Int. Cl.
*G06F 21/00* (2006.01)
*G06F 3/00* (2006.01)
*G06F 7/04* (2006.01)
*G06F 15/16* (2006.01)
*G06F 17/30* (2006.01)
*G06F 12/00* (2006.01)
*G06F 12/14* (2006.01)
*G06F 13/00* (2006.01)
*H04L 29/06* (2006.01)
*G11C 7/00* (2006.01)

(52) U.S. Cl. ............ 713/184; 713/185; 715/745; 726/4; 726/5; 726/21

(58) Field of Classification Search .................. 715/745; 713/184, 185, 183; 726/4, 5, 9, 10, 21
See application file for complete search history.

(56) References Cited

U.S. PATENT DOCUMENTS
6,985,953 B1 * 1/2006 Sandhu et al. ............... 709/229
(Continued)

FOREIGN PATENT DOCUMENTS
WO    WO 2006/045151 A1 *  5/2006

OTHER PUBLICATIONS
Vasco Data Security. Digipass for Web. 2006. p. 1-2.*

*Primary Examiner* — Christian Laforgia
(74) *Attorney, Agent, or Firm* — RatnerPrestia

(57) ABSTRACT

The DigiPass for the Web provides security for internet communication greater than that achieved by the use of a static password without requiring the user to install any software or to possess or use dedicated hardware of any kind. The user merely access an appropriate website which downloads an applet to the user's browser. This is a conventional function which is handled by the browser and does not require any expertise on the part of the user. The browser relies on a password known only to the user for authenticating the user to the browser/applet. The browser/applet interacts with the server to create an authentication key which is then stored on the user's computer. The user can invoke the authentication key dependent on the user's presentation to the browser/applet of the password. Since the password is not used outside the user-browser/applet interaction it is not subject to attacks by hackers. The authentication key is also protected from attacks by encryption although the user need not memorize any information other than the password.

15 Claims, 7 Drawing Sheets

U.S. PATENT DOCUMENTS

| | | | |
|---|---|---|---|
| 7,082,532 B1 * | 7/2006 | Vick et al. | 713/155 |
| 7,346,775 B2 * | 3/2008 | Gasparinl et al. | 713/170 |
| 7,359,976 B2 * | 4/2008 | Ross et al. | 709/229 |
| 7,475,152 B2 * | 1/2009 | Chan et al. | 709/229 |
| 7,665,127 B1 * | 2/2010 | Rao et al. | 726/9 |
| 2005/0010764 A1 * | 1/2005 | Collet et al. | 713/165 |
| 2006/0064463 A1 * | 3/2006 | Chan et al. | 709/206 |
| 2006/0101114 A1 * | 5/2006 | Sandhu et al. | 709/203 |
| 2008/0052775 A1 * | 2/2008 | Sandhu et al. | 726/14 |
| 2008/0167966 A1 * | 7/2008 | Ramsdale et al. | 705/18 |

* cited by examiner

DIGIPASS FOR WEB-FUNCTIONAL DESCRIPTION

CROSS REFERENCE TO RELATED APPLICATIONS

This application is a National Phase filing under 35 U.S.C. §371 of PCT/US2006/008439 filed Mar. 9, 2006.

FIELD OF THE INVENTION

The invention relates to improvements in security in computer networking.

BACKGROUND

It has become common, and as time goes on more so, for applications to be accessed and transactions conducted remotely over public networks such as the internet. The popularity of these applications has attracted the attentions of hackers and criminal organizations. To protect the applications against unauthorized access, many application providers rely on their users having to submit, during the login, the combination of the user identification (userid) and a password. In most cases the password is static, i.e., the same password value remains valid over a relatively long period of time.

For hackers to get access to a remote application to engage in fraudulent transactions, it is sufficient to obtain a valid userid-password combination. For example, a popular method is to send fake e-mail requesting the user (with some more less credible pretext) to send his userid-password in response. This is often referred to as phishing. Another popular method is to create an imposter website that conveniently looks like the real website. Of course, when a user attempts to login, his userid-password is captured for later misuse.

Because of the ease of success hackers have achieved in obtaining valid userid-password combination, it is now widely accepted that a stactic password alone offers too low a level of security to be acceptable for applications involving financially valuable transactions and like. Accordingly, there is a need for an alternative user authentication method offering a higher level of security.

Alternative techniques do exist. These include:
1. Certificates (i.e., software, on smartcards or USB tokens).
2. Hardware strong authentication tokens.
3. Soft tokens (i.e. software emulating hardware strong authentication tokens).
4. Smart Cards.
5. USB tokens.

In most cases users either have to be equipped with a personalized hardware device (USB tokens, Strong Authentication tokens, Smart Cards, etc. . . . ) or they must install some personalized piece of software (software certificates, soft tokens etc. . . . ). The major disadvantage of these solutions, when compared to the ordinary userid-password method, is that either:

(a) They are more costly (because of the specific hardware that is required to implement them), or
(b) They limit the mobility of the user to a specific computer (in particular the computer on which hardware or personalized software has been installed), or
(c) They are not easy to use (the user needs to follow a complicated installation procedure that might fail), or
(d) A combination of the foregoing disadvantages.

Accordingly, what is needed is a solution which provides greater security than of the userid-password but yet retains the major advantages of the userid-password, i.e. low cost, easy to use and easy to migrate from one computer to another.

Typically users use a computer, such as a personal computer (pc) to access applications on a remote server. However devices other than pc's are also used, i.e., mobile devices such as a personal data assistant (pda) and web enabled cellphones and the like. For the purposes of this application the term personal computer or pc shall include all such devices as well as other similar devices which can access through the internet a remote internet device, such as a server, and exchange information and messages by means of a browser software, whether that access is via a landline or includes a wireless component.

SUMMARY OF THE INVENTION

The Digipass for Web solution is based on the following principles:

a. For each user, a server associates the user with an authentication key.
b. The authentication key associated with a specific user is also stored locally in a personal computer in the form of a cookie.
c. The user's authentication key stored in the cookie is protected by a password known only to the user.
d. The server's login web page contains an embedded authentication applet (i.e., a software component that can be referenced and called in a web page and is automatically downloaded by the browser if it is not already present in the accessing personal computer). The applet is preferably a Java Applet but alternatively it could also be e.g. an ActiveX component.
e. The authentication applet is able to request a user to enter the password.
f. The authentication applet is able to access the cookie storing the password protected authentication key. The applet is able to obtain access to the authentication key with the password that the user has entered.
g. Using the accessible authentication key (associated in the server with the specific user), the authentication applet can either authenticate the user, or sign transaction data to guarantee the authenticity and integrity of the transaction.

By virtue of these principles the DigiPass for Web solution achieves higher security then just a static password: for successful authentication, two factors are needed i.e. the cookie (containing the authentication key) and the user's password (in order to decrypt the authentication key which is stored in the cookie). The DigiPass for Web solution provides a cost effective solution in that there is no hardware to distribute and the only software which is needed (the authentication applet) is automatically downloaded when required. The DigiPass for Web solution also provides user convenience in that the user does not have to go through any particular installation process that might fail and that the user operates the solution in exactly the same way as with a static password, that is the user just has to enter a password (i.e. the dynamic authentication mechanism is completely transparent to the user). This follows from the fact that everything which is required by the solution is either standard browser functionality or is provided in an applet that is automatically downloaded by the browser.

In some cases (such as in the first use of the applet), when the applet is used by a specific user, the user is asked to choose and enter a migration secret. The migration secret or a hash of the migration secret is securely transferred to the server. If, thereafter, the user attempts to access the server using a personal computer which does not store the authentication key in a cookie, the following events will unfold. On detecting this condition the authentication applet requests the user to enter the migration secret as well as a password. This will be referred to as a local password and it can be the same or different as the password used on the original PC. Using the migration secret the applet can then securely download an authentication key (either the same authentication key which is stored in the cookie on the user's normally used PC, or a different authentication key) from the server and then locally store the downloaded authentication key in a cookie on the PC, currently employed by the user [FCO: shouldn't we somehow mention that the authentication in the cookie on the new PC is protected by the password that the user entered along with the migration secret?]. With this feature, the Digi-Pass for Web solution also provides for mobility e.g. the user can migrate from a PC normally used, to a different PC, without having to plan in advance.

It should be apparent from the foregoing that both the server and a user PC maintain an authentication key, in one form or another. In one embodiment of the invention reliance is based on standard security offered by the internet connection between the user PC and the server to maintain the confidentiality on the initial exchange of the authentication key. For example, the user PC and the server might rely on a standard SSL/TLS connection.

In an alternative embodiment the user and server share a secret at a time prior to an initial contact between the PC and the server. This might be the case if the user had been a user with an established userid and static password and the intention was to migrate the user to the DigiPass for Web solution for authentication purposes. If the user and server share such a historical secret (e.g. the user's password) then the secret can be used to secure the initial exchange between the user and server of the authentication key.

In one embodiment the historical secret (the existing static password) can be used according to some existing password based authentication key-exchange protocol (e.g. SRP-Secure Remote Password protocol) to protect the exchange of the secret authentication key.

In another embodiment the user and server use a communication channel other than the internet (such as e-mail, an ATM machine, paper based mail, etc.) to exchange the authentication key directly, or another secret that will then be used in the same way as the historical secret described above.

The authentication key, in one embodiment, is a symmetric encryption key which is used both at the server and at a user PC. With symmetric authentication keys, user authentication can be achieved using existing authentication protocols based on shared secrets such as the Challenge Handshake Authentication Protocol (CHAP).

In an alternative embodiment the authentication applet uses a shared authentication key to emulate a hardware strong authentication token. In that case the applet generates dynamic passwords which are calculated as follows:

a. The applet takes the value of a variable input which is implicitly or explicitly known to the server. The variable input could be the current time, a challenge dynamically generated by the server, the value of a counter that is stored locally (in the same cookie with the authentication key) and incremented automatically after each usage, or a combination of any of the above.

b. The applet encrypts the variable input (as is or with some particular formatting) with the authentication key by using some symmetric encryption algorithm.

c. The resulting cryptogram (as is, or after some further formatting and/or truncation) is a dynamic password and is then sent to the server.

d. The server knows the value of the variable input and the value of the authentication key associated with the given user. With this data, the server performs the same calculations to obtain its own value for the dynamic password.

e. The server compares the dynamic password value that it generated with the value that it received from the user. If both values are the same or otherwise compare, then the user is considered to be authenticated.

Alternatively, signing transaction data with a shared secret by generating a Message Authentication Code (MAC) is common practice. One example is described in the standard ANSI X9.9. An alternative includes the transaction data in the variable input for the authentication algorithm which was described above.

As an alternative the authentication key may be a private part of a public-private key pair. In that case, the server holds, for each user the public key part corresponding to a private key associated with the user. Authenticating users and signing data by using a private-public key pair is a common practice that need not be explained here.

In one embodiment of the invention the correctness of the user's password, entered in response to a request by the applet, is not validated locally before the authentication key is decrypted. Instead, the applet decrypts the encrypted authentication key with the password as provided by the user, but if the value of the provided password is not correct the value of the decrypted authentication key will also be incorrect. Consequently, the authentication will fail. The consequences of that failure and repeated failures depends on the server's configuration, i.e., whether and after how many trials the user's account will be blocked in a number of consecutive failed authentication attempts.

In another embodiment the password can be checked locally by the applet before being used to decrypt the authentication key.

In one embodiment the cookie not only stores the encrypted authentication key, but also a hash of the password. When the user enters the password, the applet calculates the hash of the password and compares it with the hash stored in the cookie. If both values match the password entered by the user is correct and the applet continues with decrypting the authentication key.

The main disadvantage of local validation of the password occurs in the event that an attacker has gained access to the cookie. That attacker can in principle mount an off-line exhaustive search. On the other hand, in the case of remote validation (by the server), the only way to validate the password is by trying an authentication. Thus the server can easily detect an exhaustive search.

In one embodiment the cookie which is stored on the user's PC may be bound to the user's PC. This can be done by not only validating the user's password but also the identity of the user's PC. This can be implemented by modifying the password used to encrypt the authentication key stored in the cookie by combining the password with the value of one or more data elements representing the identity of the user's PC. These data elements may be selected as serial number of the users PC processor, motherboard, hard disk drive, ethernet card, etc. For example, the authentication key is encrypted under a combination (concatenation) of the user password and the serial number (or a part thereof) of the users PC processor.

In one embodiment the authentication key which is downloaded to a new user PC, when the user migrates from one PC to another, has the same value as the authentication key on the users old PC. This means that actually the new user PC has received a copy of the cookie on the old user PC.

In principle the user can work from both the old and new PCs. In practice this could create synchronization problem if the input variable is counter based, since the counters on both user PCs may well evolve independently. This problem can be avoided if the input variable for the authentication algorithm is not counter based but is instead challenge based.

The disadvantage of this embodiment is that a valid copy of the authentication key remains present on each PC that the user has ever worked with. This could represent a security risk.

In another embodiment of the invention, the server generates a new value for the authentication key that is downloaded to a new user PC when a user migrates from one user PC to another. The operation of the server also invalidates the old value of the authentication key that is stored in the cookie of the old user PC. This avoids the situation arising from valid copies of the encrypted secret authentication key remaining on old user PCs. A disadvantage arises if the user migrates to another user PC and then afterwards wants to work on the original PC again. In that case the user has to migrate to the older user PC again. However, it is not apparent to an applet, that a cookie on the user PC has been invalidated. In this situation, if the applet on an old user PC is not aware that the authentication key available to it has been invalidated, the situation could lead to sequential invalid attempts, which in turn could lead to the server blocking the user's account.

Thus in one aspect the invention provides a method of authenticating a user with respect to a web server in the context of a web browsing session, the user operating a personal computer connected to the internet and communicating with said web server by means of a web browser capable of managing and storing cookies, which method provides greater security than the use of easily memorized passwords without requiring the user to maintain a physical object comprising:
storing a cookie in the personal computing device, the cookie including a first key, the first key stored in the cookie in an encrypted form, encrypted under a password dependent on information known only to the user, the first key also known to the web server and associated in the web server with the user,
the browser receiving from the web server a web page containing an embedded applet in response to an access request directed to the web page, the applet embedded in the web page requiring the user to enter the password,
the applet decrypting the encrypted key stored in the cookie, using the password, to generate said first key, and
employing the first key for authenticating the user to the server and/or signing data transmitted to the server.

In another aspect the invention provides a server implemented method providing for the authentication of a user to a web server in the context of a web browsing session operating with a personal computer connected to the internet and communicating with said web server by means of a web browser capable of managing and storing cookies, which method provides greater security than the use of easily memorized passwords without requiring the user to maintain a physical object comprising:
maintaining a file associating each of a plurality of users with a different first key,
in response to an access by a particular user using a personal computer, transmitting, to the personal computer, an applet embedded in a web page requested by the access of the user's personal computer,
said applet, when executed on the personal computer;
requesting the user to input a password,
accessing a cookie, if present, on the user's personal computer and decrypting an encrypted first key stored in said cookie with the password to recover first key related to the user, and
using the first key to authenticate the user to the server and/or signing data transmitted to the server.

The invention further provides a method as described wherein the user may access the web server with a particular personal computer which already maintains a cookie in storage including a first key encrypted under said password, or in which the user may access the web server with another personal computer which does not yet maintain the cookie in storage, or in which the user may access the web server with a particular personal computer which already maintains a cookie in storage including a first key encrypted under said password but whereby that cookie somehow is lost or corrupted,
said file maintained by the server also including a migration secret, or a hash of a migration secret,
said server authenticating the user on receipt of information which favorably compares to the migration secret or the hash of the migration secret stored on the server or by means of an authentication protocol that demonstrates that the user knows the correct value of the migration secret,
the server thereafter transmitting an indication signifying the user shall be authenticated on presentation of the password.

BRIEF DESCRIPTION OF THE DRAWINGS

The method and apparatus will be described in further detail so as to enable those skilled in the art to make and to use the when taking in connection with the attached drawings wherein.

DETAILED DESCRIPTION OF PREFERRED EMBODIMENTS

DigiPass for Web includes five phases:
a. Pre-registration (optional): The user and the server establish some shared historical secret.
b. Registration Phase: The user registers with the server employing a PC.
c. Activation Phase: The user's PC is activated by obtaining a shared authentication secret.
d. Operational Phase: Using the shared authentication secret, the user's PC can generate dynamic passwords and/or dynamic signatures to authenticate the user and the transactions originated by the user, and e. Migration Phase: The user migrates to a different PC.

Pre-Registration Phase

In this phase the user and the server somehow establish some shared historical secret which will be used in the following phase when the DigiPass for Web PC (client) will be activated.

This phase is optional in DigiPass for Web. It is typically included if a higher level of security is required. The shared historical secret could be:

a. An existing internet password that the server and user already share, or
b. A password that is specifically generated for the purpose of being used in a registration and activation phase.
c. The historical secret can be exchanged between user and server in a number of ways. For example, the exchange can take place:
  1 At a bank branch when the user signs a contract for internet banking service.
  2. Through an ATM after the user has entered his ATM card and input the PIN code or,
  3. As part of other information included in a printed confidential banking statement sent to the user via conventional mail, or
  4. In the form of a PIN mailer sent to the user via registered mail.

Registration Phase

Figure 1:
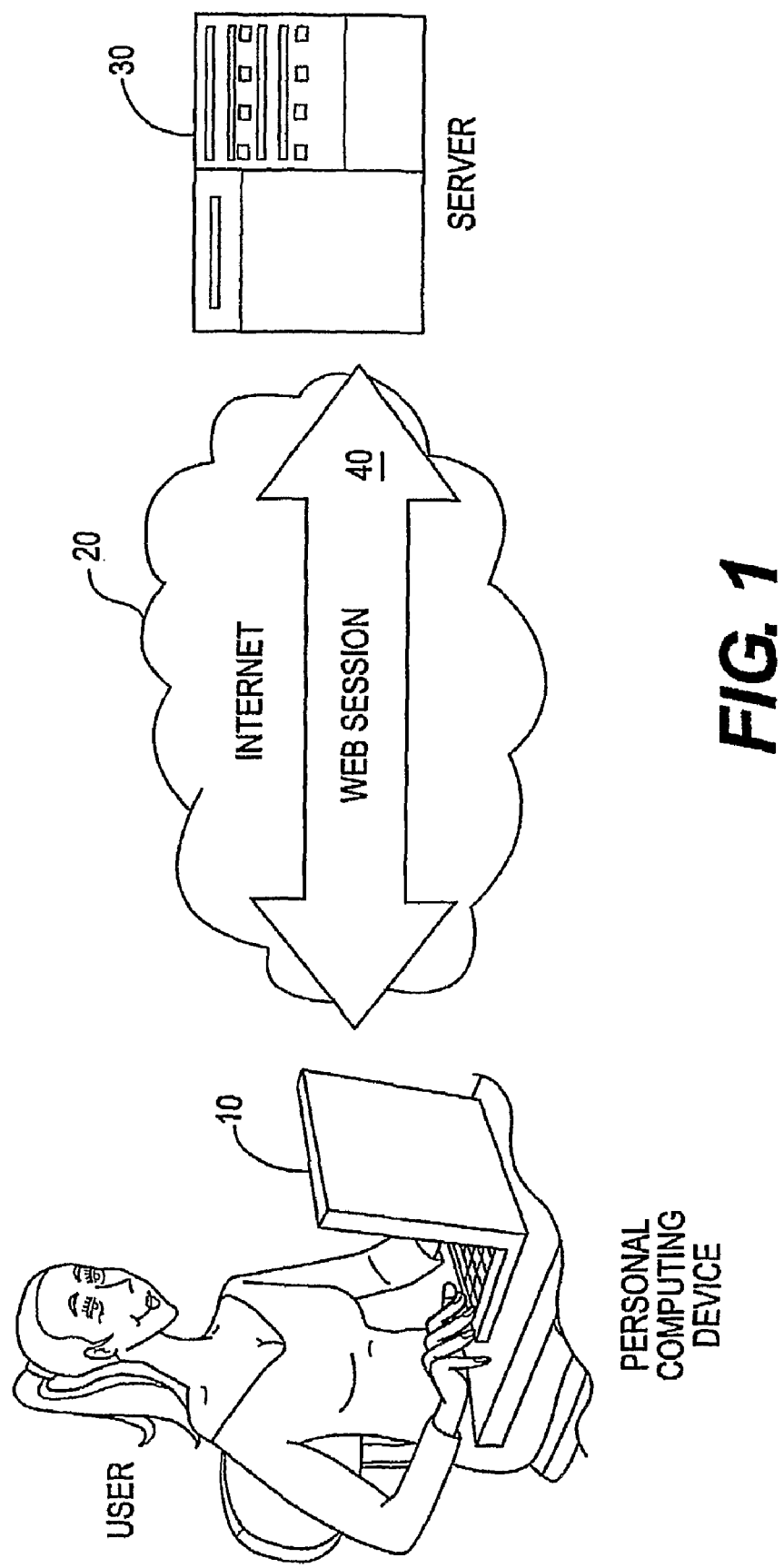
FIG. 1 is a schematic illustrating the relationship between the main elements of the DigiPass for Web including the user's personal computing (PC) device and its connection to the server through the internet.

During this phase the user registers for the DigiPass for Web service and the DigiPass for Web is activated on the user's PC (client). FIG. 1 illustrates the important components in this process. In particular, the user operates a personal computer device 10. This is typically a personal computer although as mentioned other devices can also be used. The personal computing device 10 is connected (either through a wired or wireless connection) via the internet 20 to a server 30. A web session 40 ensues wherein the registration of the user's PC 10 is effected.

Figure 2:
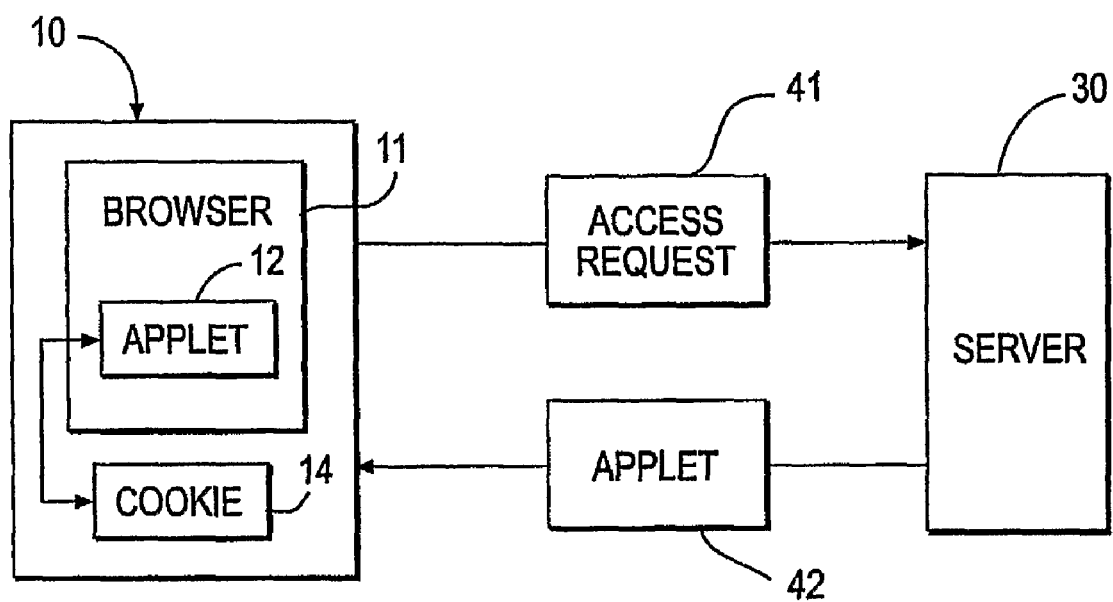
FIG. 2 is a block diagram showing an access request of the server by the PC.

FIG. 2 illustrates in block diagram showing important components of the personal computer 10, the server 30 and identifies the important information which is exchanged during the part of the web session 40 during which the registration is implemented.

FIG. 1 illustrates the typical interaction between a user, operating a personal computing device, such as the PC 10 and an internet server 30, in which both PC and server take part in a web session 40 supported by the internet 20. FIG. 1 is representative of operations in the registration, activation and operational phases of the DigiPass for Web. One of the advantages of the DigiPass for Web is the ability of the user to migrate from use of a PC 10 (shown in FIG. 1) to a different PC or other user device. The manner in which migration is implemented will be described hereinafter in connection with FIG. 7.

Registration Phase

Prior to use of DigiPass for Web, certain data must be exchanged by the user and server. This is accomplished during the registration phase. At this time the user registers for the DigiPass for Web service.

FIG. 2 is a block diagram showing the interaction between the user PC 10 and server 30. Prior to registration and/or activation the user PC 10 would not include the applet 12 shown in FIG. 2. In fact, during the registration and activation phase the applet 12 is supplied to the user PC 10 from the server 30. Furthermore the cookie 14 will be created by the applet 12, also at a later phase of the process. At the initiation of the registration phase, the user PC 10 includes a browser 11 which, responding to a request by the user, may transmit an access request 41 to the server 30. Depending on the particular URL contained in the access request 41, the server responds with a web page containing the applet 12 as illustrated in FIG. 2. The applet 12 includes content specific to the registration functions. The applet 12 may also include content related to activation, although that is not essential, applet content for the activation may be supplied at a later time, specifically when activation functionality is required. The applet 12 may also include content specific to authentication functions to be executed in an operational phase. Depending on how the implementation is structured, there may be only a single applet which provides for registration, activation and operation. Alternatively, there may be different applets for registration on the one hand and another applet for the activation and operational phase. Furthermore, depending on implementation detail even the operational applet may be divided into different segments. Those skilled in the art will understand how to segment the applet so that the overall operation is relatively seamless.

Figure 3:
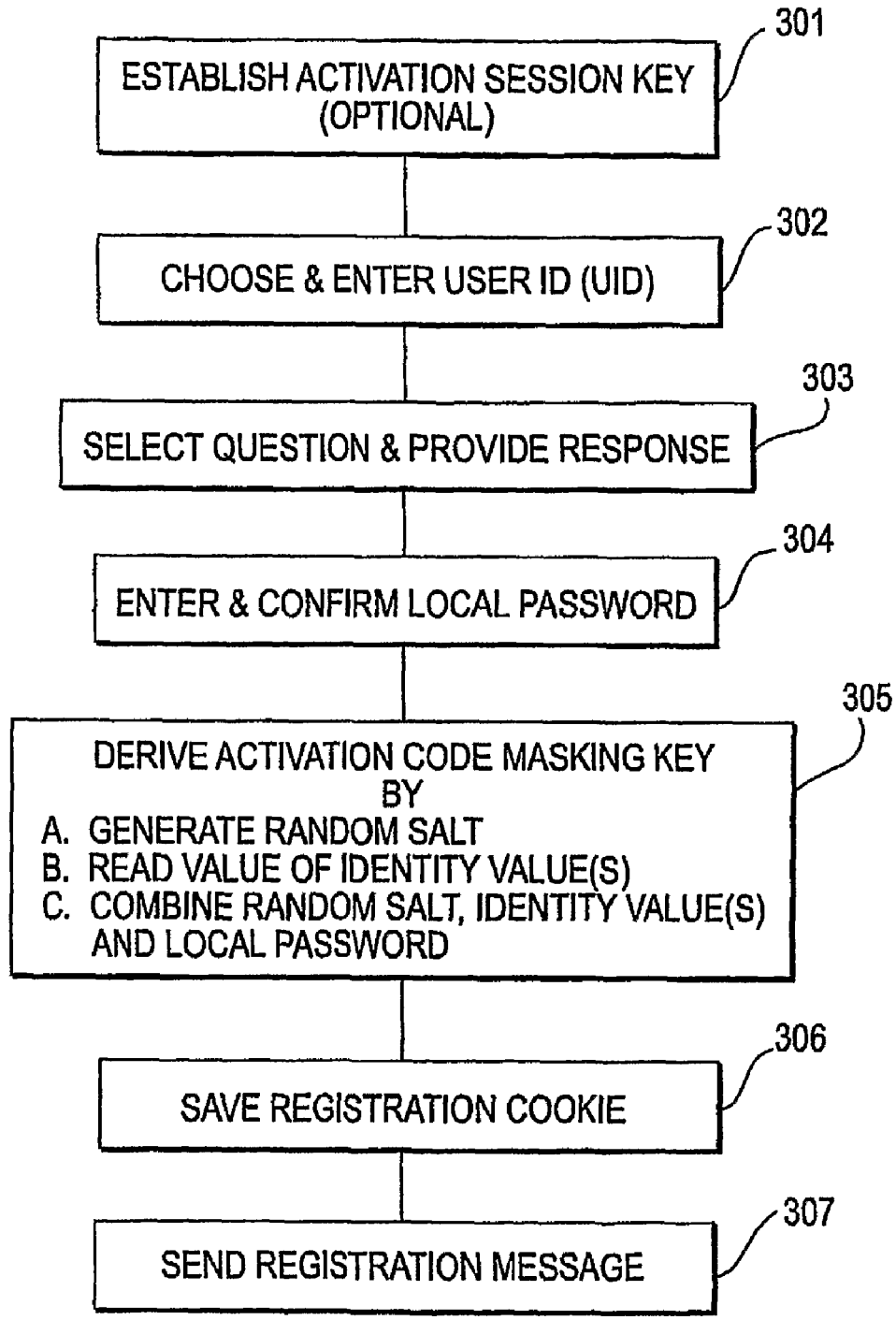
FIG. 3 illustrates the major functions of the authentication applet in the registration and activation operations.

The browser loads the applet 12 and then executes it. FIG. 2 also represents the initial stages of the registration phase, however at the start of the registration phase the cookie 14 will not be present. In particular, the user directs the browser 11 to the website of the server 30. In response to the access request 41, the server 30 transmits the appropriate applet e.g. the registration and activation applet for example. When the applet 12 is received and loaded by the browser 11 it is executed The major functions performed by the activation applet are shown in FIG. 3. The initial function 301, to establish an Activation Session Key is optional. In order to establish the activation session key there must be some historical secret which, prior to execution of function 301 is shared between the user and the server 30. If that is the case then the user can initiate function 301. Function 301 requests the user to enter the historical secret. On receipt of the secret, the applet 12 uses the secret with a protocol to establish a common session key (the activation session key) on the basis of the shared historical secret. Usually, i.e., in most protocols, some data (e.g. so-called 'salts' or 'nonces') will be generated and exchanged which is used to derive the common session key from the shared historical secret; that data will be referred to as the activation session key derivation data. Function 301 concludes with the applet 12 saving the activation session key derivation data.

Thereafter, function 302, applet 12 requests the user to choose and enter a userid (UID). Thereafter, function 303 requests the user to select a question from a list of pre-defined questions (what is your mother's maiden name?", "what is your favorite movie?", "what is your pet's name?" etc.) and enter the secret answer to that question. The answer will be used in the migration phase and will be referred to as a migration secret or secret answer.

Thereafter, function 304 asks the user to choose, enter and confirm a local Digipass for Web password. This Digipass for Web password will become the password used by the PC 10 for decryption purposes (see functions 603, 606 and 607 of FIG. 6). In particular, the password will be used to protect an authentication key that will be stored in a cookie on the PC. Although, in some embodiments the password may be transmitted to the server, it will not be stored on the server and hence the password can be referenced as information which is available only to the PC 10

Thereafter, function 305 derives the activation code masking key. This is performed in a sequence of steps. First the applet generates a Random Salt. Thereafter, the applet 12 reads the value of some data element(s) that represent the identity of the user's PC. This may be the serial number of the PC processor, hard disk drive, motherboard etc. The applet then combines the Random Salt, the PC identifying value(s), and the local password in order to obtain the activation code masking key using a cryptographic algorithm. The algorithm should be selected to have the following characteristics:

1. It is very hard to find a combination of Random Salt, PC identifying values and local password that will result in a given value for an Activation Code Masking Key, and
2. For a given Random Salt and PC identifying values, it is hard to find a local password that will result in a given value for the Activation Code Masking Key.

An example of an appropriate cryptographic algorithm is the hashing by SHA-1 of the concatenation of Random Salt, the PC identifying values and the local password.

Thereafter, Function 306 saves a registration cookie on the users PC 10. The cookie contains two or three elements. The first element is the Activation Session Key derivation data if optional step 301 was performed e.g. if the user and the server had, prior to the activation, shared a historical secret. The cookie also contains the Random Salt as well as the UID.

Finally, at Function 307 the applet 12 transmits a Registration Message, containing four elements, to the server. The message contains:

a. UID.
b. The user's e-mail address.
c. The hash of the secret answer (migration secret).
d. The Activation Masking Key.

If the optional Function 301 was performed, and correspondingly an activation session key was established, the registration message is encrypted with an Activation Session Key. That terminates the operation of the applet 12 in the registration phase.

Figure 4:
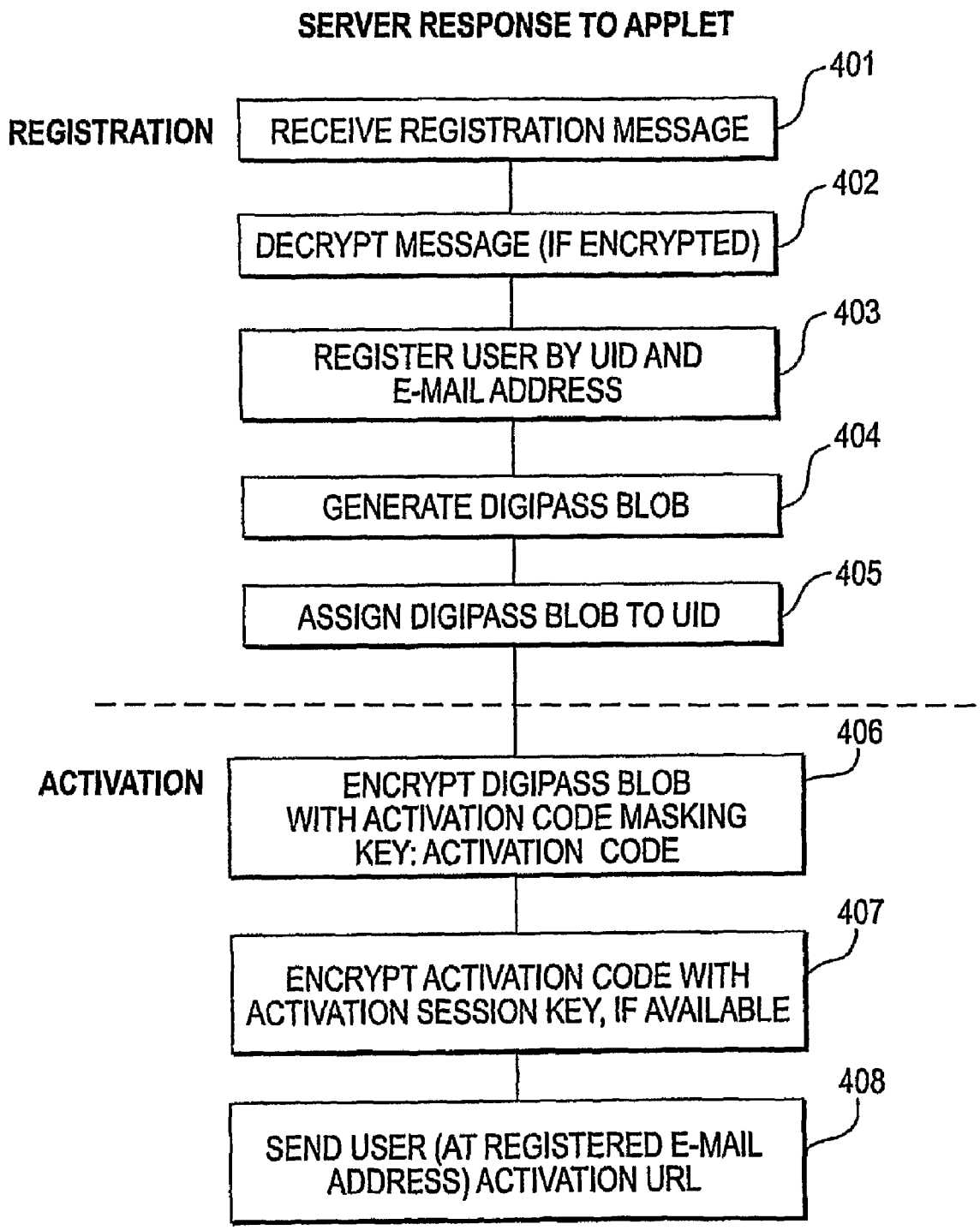
FIG. 4 illustrates the server functions performed in response to information transmitted by the applet in the registration and activation phases.

FIG. 4 illustrate the response of the server 30 to information provided by the applet 12 in the concluding portion of the registration phase as well as the initial stages of the activation phase.

As shown in FIG. 4, in the initial function, 401, the server 30 receives the registration message. At function 402 that message is decrypted, if it had been encrypted.

At function 403 the server registers the user using the UID, e-mail address, and the hash of the secret answer (migration secret).

At function 404 the server generates a DigiPass Blob. The DigiPass Blob instance for this particular user contains the Digipass secret authentication key (originated at the server), and the Digipass algorithm parameters e.g. parameters indicating the type of variable input for the Digipass OTP (to be described) and Signature algorithm, the kind of formatting to apply to the variable input, the kind of formatting to apply to the cryptogram. The DigiPass Blob instance is assigned to the UID for this particular user, function 405, i.e., it is indexed so that it's contents will be associated with this user The server 30 then performs functions 406 through 408.

In particular, in function 406 the server 30 encrypts the DigiPass Blob with the Activation Code Masking Key; the result is referred to as the Activation Code. The server 30 then encrypts the Activation Code with the Activation Session Key, if available. Recall that the Activation Session Key is optional and requires the preparatory sharing of a historical secret between the user and the server 30. Finally, at function 408 the server sends an e-mail to the user, at the user's registered e-mail address, the e-mail containing an activation URL. The activation URL will, when accessed by the user provide the user with an activation applet as described hereinafter.

Figure 5:
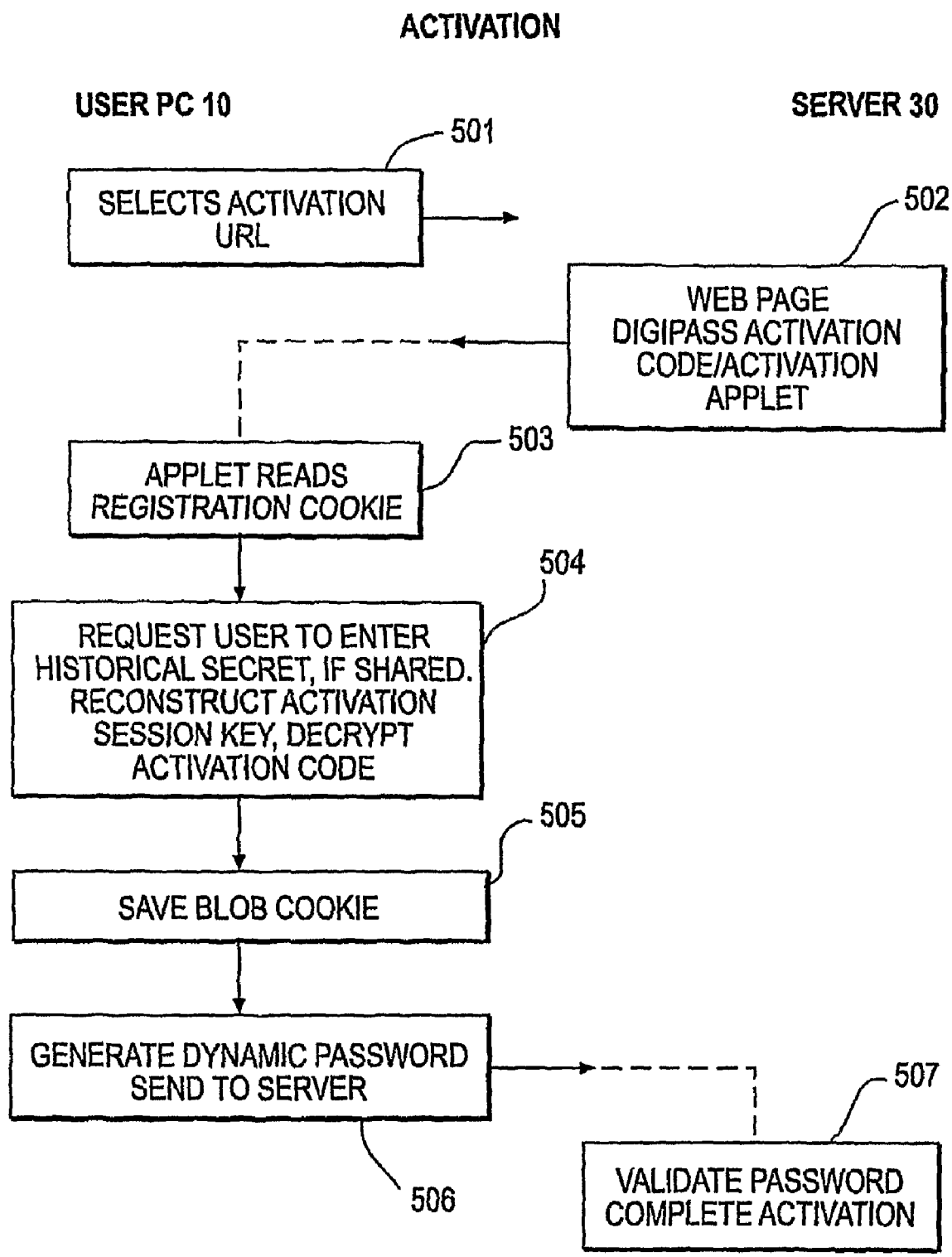
FIG. 5 illustrates major functions performed by both server and PC in the completion of the activation phase.

FIG. 5 illustrates the completion of the activation process subsequent to the execution to function 408 at the server 30.

As shown in FIG. 5 the next step which is performed is function 501 executed by the user PC 10. Function 501 occurs when the user selects the activation URL. When the server 30 receives the access from the user of PC 10, the server 30 sends the web page containing the specific DigiPass activation code identified with the user along with the activation applet.

The activation applet and DigiPass activation code is received at the user PC 10. In function 503 the applet reads the registration cookie stored in the PC 10 (stored at function 306).

At Function 504 the applet requests the user to enter the historical secret if there had been a shared historical secret preparatory to the registration phase. If there was such a secret the Activation Session Key is reconstructed by the PC 10 (from the shared historical secret entered by the user, and the activation session key derivation data stored in the registration cookie). Access to the Activation Session Key allows the applet to decrypt the Activation Code. On the other hand, if there was no historical secret, the Activation Code would not have been encrypted and hence no decryption operation would be necessary.

Thereafter, at function 505 the user PC 10 saves the DigiPass Blob cookie on the PC 10. The Blob cookie contains the UID, Random Salt, the DigiPass Activation Code and a particular counter value.

To confirm successful activation the DigiPass authentication applet generates a dynamic password, function 506 The server 30 receives the dynamic password, function 507 This completes the activation phase. The generation of the dynamic password in function 506 and its validation at function 507 confirm, at the server, that the activation has been successful. The details of function 506 are the same as functions 603-609 to be described in connection with FIG. 6.

Figure 6:
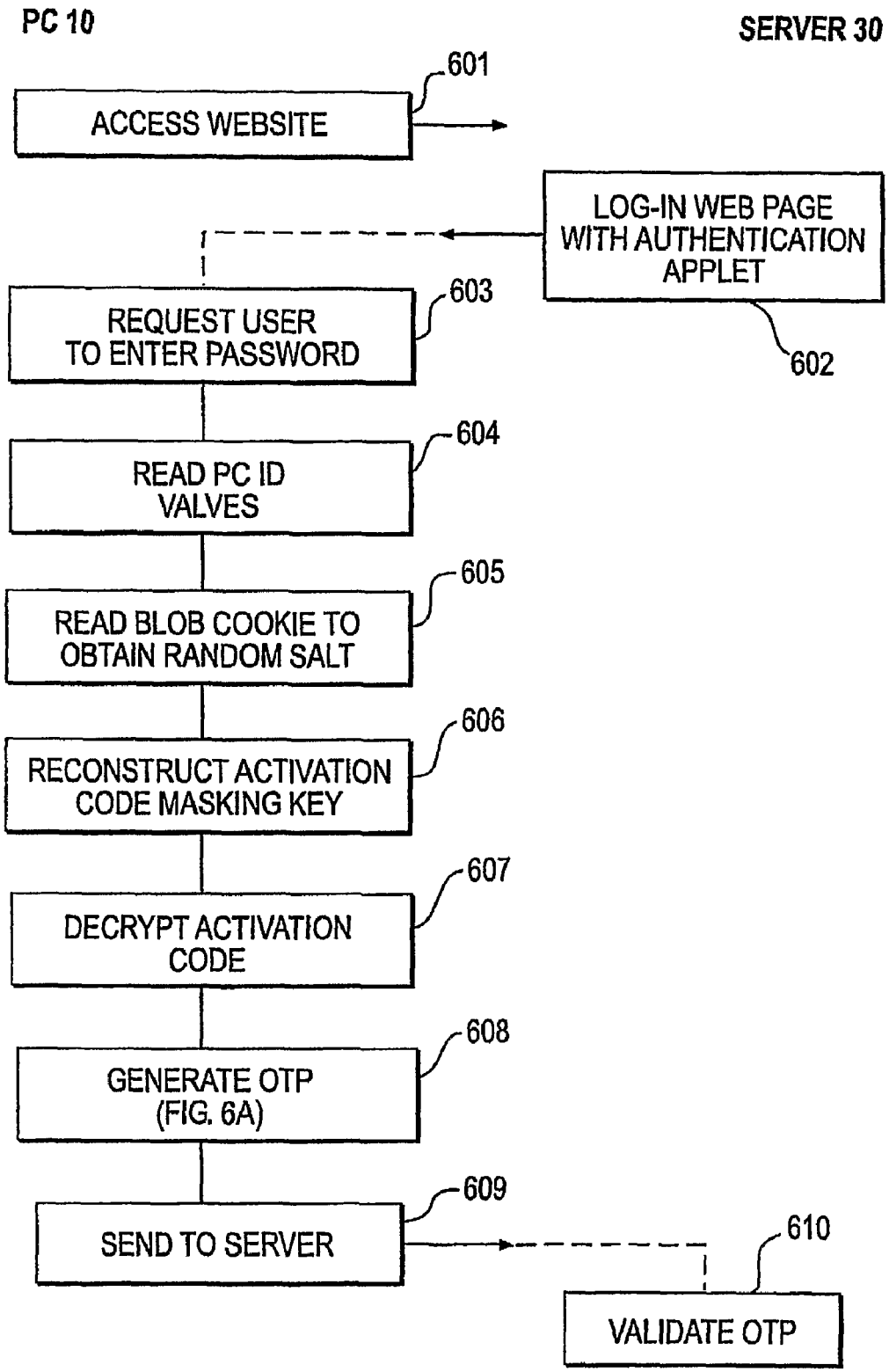
FIG. 6 illustrates the operational phase showing the major functions in the interaction between the PC and the server.

FIG. 6 illustrates the interaction between the PC 10 and the server 30 in the operational phase.

As shown at function 601 the operational phase is initiated when the user, subsequent to registration, directs the PC 10 to access the appropriate web site of the server 30. In response to the access by the user, the server 30, at function 602, transmits a login page to the user containing the authentication applet. Functions 603 etc. are directed by the authentication applet at PC 10.

In particular, at function 603 the user is requested to enter the local password that the user had chosen and entered in function 304 of FIG. 3. At function 604 the applet reads the PC ID value(s) (which had been used in the encryption algorithm of function 305). At function 605 the applet reads the Blob cookie to obtain the Random Salt. At function 606 the applet reconstructs the Activation Code Masking Key, based on the data recovered in functions 603 to 605. With the reconstructed activation code masking key at function 607 the activation code is decrypted.

Based on the decrypted activation code Function 608 generates a One Time Password (OTP). Function 609 sends the OTP to the server. Function 610 (executed by the server 30) provides for validation of the OTP received at the server 30. The server 30 validates the OTP by using its own data values and generates a server version of the OTP which is then compared to the received OTP. Validation of the OTP authenticates the user to the server 30.

As an alternative to sending the OTP to the server 30 for authentication purposes, the user could use the OTP to encrypt or sign data related to transactions or messages. This would in effect "sign" the data for the transaction or messages by the user so that the data and/or messages would be accepted by the server 30 as authentic.

Migration Phase

The user, having registered and used the DigiPass for Web service from one PC, may desire to use the DigiPass for Web service from a different PC, a PC that has not been registered. Furthermore, it is sometimes is important for the user to be able to perform this function without any planning e.g. on a spur of the moment basis. The DigiPass for Web service provides this functionality in a migration phase.

Figure 7:
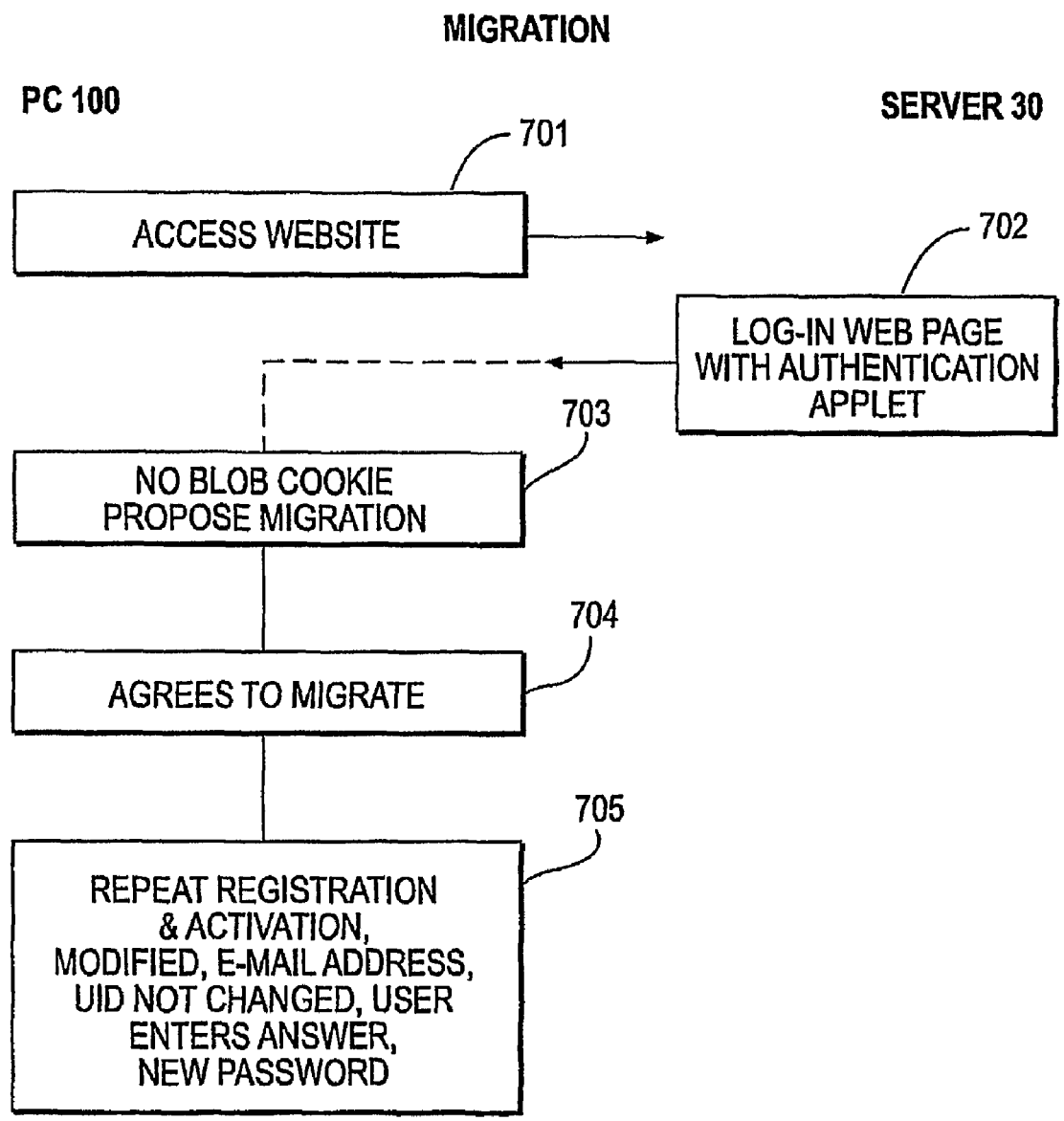
FIG. 7 illustrates the migration operation showing the major functions in interaction between the user's new PC and the server.

FIG. 7 illustrates the function performed during the migration phase. Initially, the user accesses the website of server 30 (function 701) from PC 100, a computer that has not been registered and hence does not store the data that is stored on the PC 10. The server 30 responds to the access request from the user by sending a login web page with an authentication applet, e.g. the server 30 does not respond any differently to the access request from PC 100 that it would respond to a request from a registered PC such as PC 10.

At function 703 the applet having been installed in the browser 11 determines that there is no stored Blob cookie, as there should be had the PC been activated and registered. Accordingly, the applet proposes a migration function to the user, function 703. For purposes of this description we assume that the user agrees to the migrate function, function 704.

Thereafter, the applet repeats the registration and activation functions, as described in connection with FIGS. 3, 4 and 5 with several modifications. The users e-mail address and UID are not changed. However, in order to authenticate the user, the user will be required to enter the secret answer that previously had been entered at function 303. In addition, the user will be required to enter a new local password in lieu of the local password entered at function 304.

The applet and server employ the secret answer as an historical secret and perform the registration and activation processes as already explained.

An implementation issue in the migration phase is whether or not the secret authentication key generated by the server should be same as the secret authentication key that had been generated by the sever and used with the originally registered PC 10, or should it be a new secret authentication key. Actually, the secret authentication key generated in the migration phase may be either the same or different in that there are advantages and disadvantages from either embodiment. An advantage is that using the same authentication key allows the user to work alternately from the old and new PC, as desired. A disadvantage is that if a counter value forms an element of a key, there may be synchronization problems in that the old and new PC's would more than likely store different counter values. Of course, this disadvantage can be eliminated if the input variable for the authentication algorithm is not counter based. Another disadvantage of this approach is that a valid copy of the secret authentication key remain present on every PC that the user has ever registered and activated. This may well itself represent a security risk.

Alternatively, the server 30 could generate a new secret authentication key for each new PC to which the user migrates. This necessarily means that the earlier secret authentication key becomes invalid. The advantage of this implementation is the presence of old secret authentication keys on previously used PCs is no longer a risk since those keys are invalid. A disadvantage of the approach is that if the user, having migrated to PC 100, now desires to return to the PC 10, the user would have to perform another migration operation since the secret authentication key contained in the PC 10 would have been invalidated by the migration to the PC 100.

It should be apparent that this specification describes one or more examples of implementations of the invention. Those skilled in the art will recognize that many and varied changes can be made falling with spirit and scope of the invention. Accordingly the scope of the claims should not be limited by the specific examples described herein.

We claim:

1. A method of authenticating a user with respect to a web server in the context of a web browsing session, the user operating a personal computer connected to the internet and communicating with said web server by means of a web browser capable of managing and storing cookies, which method provides greater security than the use of easily memorized passwords without requiring the user to maintain a physical object comprising:

storing a cookie in the personal computer, the cookie including an authentication key, the authentication key stored in the cookie in an encrypted form, encrypted under a key dependent on a password known only to the user, the authentication key also known to the web server and associated in the web server with the user;

the browser receiving from the web server a web page containing an embedded applet in response to an access request directed to the web page, the applet embedded in the web page requiring the user to enter the password and verifying the presence of the cookie on the personal computer;

the applet, if said cookie is present, decrypting, using the password, the encrypted authentication key stored in the cookie, and employing the decrypted authentication key for authenticating the user to the server and/or signing data transmitted to the server;

wherein the applet, if said cookie is not present, requests that the user enter a migration secret known to both the user and the web server, uses the migration secret to obtain from the web server the authentication key associated with the user, and stores the obtained authentication key in the cookie on the personal computer encrypted using the password.

2. The method of claim 1 wherein the encrypted authentication key that is stored in the cookie is encrypted with a combination of a password known to the user and information representing at least one characteristics of the personal computing device.

3. A server implemented method providing for the authentication of a user to a web server in the context of a web browsing session operating with a personal computer connected to the internet and communicating with said web server by means of a web browser capable of managing and storing cookies, which method provides greater security than the use of easily memorized passwords without requiring the user to maintain a physical object comprising:

maintaining a file associating each of a plurality of users with a different authentication key, in response to an access by a particular user using a personal computer, transmitting, to the personal computer, an applet embedded in a web page requested by the access of the user's personal computer, whereby said applet, when executed on the personal computer requests the user to input a password;

verifies the presence of a cookie on the personal computer, the cookie including an authentication key in an encrypted form;

wherein if the cookie is present, the applet accesses the cookie, decrypts the encrypted authentication key stored in said cookie with the password to recover the authentication key related to the user, and uses the authentication key to authenticate the user to the server and/or to sign data transmitted to the server, and wherein if the cookie is not present, the applet requests that the user enter a migration secret known to both the user and the web server, uses the migration secret to send a migration request to the web server requesting the web server to provide an authentication key associated with the user, and stores the authentication key obtained from the web server in the cookie on the personal computer encrypted using the password; and in response to a migration request from the applet to provide an authentication key associated with the user, the web server verifying the migration request using the migration secret, and upon successful verification of the migration request providing to the applet an authentication key associated with the user.

4. A server implemented method providing for the authentication of a user to a web server in the context of a web browsing session operating with a personal computer connected to the internet and communicating with said web server by means of a web browser capable of managing and storing cookies, which method provides greater security than the use of easily memorized passwords without requiring the user to maintain a physical object comprising:

maintaining a file associating each of a plurality of users with a different first key, in response to an access by a particular user using a personal computer, transmitting, to the personal computer, an applet embedded in a web page requested by the access of the user's personal computer, said applet, when executed on the personal computer;

requesting the user to input a password, accessing a cookie, if present, on the user's personal computer, decrypting an encrypted first key stored in said cookie with the password to recover a first key related to the user, and using the first key to authenticate the user to the server and/or to sign data transmitted to the server, wherein the user may access the web server with a particular personal computer which already maintains a cookie in storage including a first key encrypted under said password, or in which the user may access the web server with another personal computer which does not yet maintain the cookie in storage, or in which the user may access the web server with a particular personal computer which already maintains a cookie in storage including a first key encrypted under said password but whereby that cookie somehow is lost or corrupted, said file maintained by the server also including a migration secret, or a hash of a migration secret, said server authenticating the user on receipt of first information which favorably compares to the migration secret or the hash of the migration secret stored on the server or by means of an authentication protocol that demonstrates that the user knows the correct value of the migration secret, the server thereafter transmitting second information comprising an authentication key for the applet to store in the cookie encrypted with the password and to use subsequently to authenticate the user to the server or sign transaction data transmitted to the server.

5. The method of claim 4 wherein the second information includes the first key encrypted under the password.

6. The method of claim 4 wherein the second information contains a second key, different from the first key, encrypted under the password, wherein the second key can be used instead of the first key by the applet to authenticate the user to the server.

7. The method of claim 4 wherein the applet transmitted to the personal computer is transmitted in one or more segments.

8. The method of claim 7 wherein a particular segment of the applet is only transmitted on request.

9. A system for authenticating a user with respect to a web server in the context of a web browsing session, the user operating a personal computer connected to the internet and communicating with said web server by means of a web browser capable of managing and storing cookies, which system provides greater security than the use of easily memorized passwords without requiring the user to maintain a physical object comprising:

a memory for storing a cookie in the personal computer, the cookie including a an authentication key, the authentication key stored in the cookie in an encrypted form, encrypted under a key dependent on a password known only to the user, the authentication key also known to the web server and associated in the web server with the user;

a browser receiving from the web server a web page containing an embedded applet in response to an access request directed to the web page, the applet embedded in the web page requiring the user to enter the password and verifying the presence of the cookie on the personal computer;

the applet, if said cookie is present, decrypting, using the password, the encrypted authentication key stored in the cookie, and employing the decrypted authentication key for authenticating the user to the server and/or signing data transmitted to the server;

wherein the applet, if said cookie is not present, requests that the user enter a migration secret known to both the user and the web server, uses the migration secret to obtain from the web server the authentication key associated with the user, and stores the obtained authentication key in the cookie on the personal computer encrypted using the password.

10. The system of claim 9 wherein the encrypted first key that is stored in the cookie is encrypted with a combination of a password known to the user and information representing at least one characteristics of the personal computing device.

11. A system providing for the authentication of a user to a web server in the context of a web browsing session with a personal computer connected to the Internet and communicating with said web server by means of a web browser capable of managing and storing cookies, which provides greater security than the use of easily memorized passwords without requiring the user to maintain a physical object comprising:

means for storing on the server a file associating each of a plurality of users with a different authentication key, means for transmitting, in response to an access by a particular user using a personal computer, to the personal computer an applet embedded in a web page requested by the access of the user's personal computer, whereby said applet, when executed on the personal computer;

requests the user to input a password, verifies the presence of a cookie on the personal computer, the cookie including an authentication key in an encrypted form, accesses the cookie, if present, on the user's personal computer, and decrypts the encrypted authentication key stored in said cookie with the password to recover the authentication key related to the user, and uses the authentication key to authenticate the user to the server and/or to sign data transmitted to the server, and wherein if the cookie is not present, the applet requests that the user enter a migration secret known to both the user and the web server, uses the migration secret to send a migration request to the web server requesting the server to provide an authentication key associated with the user, and stores the authentication key obtained from the web server-in the cookie on the personal computer encrypted using the password, and in response to a migration request from the applet to provide an authentication key associated with the user the web server verifying the migration request using the migration secret, and upon successful verification of the migration request providing to the applet an authentication key associated with the user.

12. A system for providing for the authentication of a user to a web server in the context of a web browsing session with a personal computer connected to the internet and communicating with said web server by means of a web browser capable of managing and storing cookies, which provides greater security than the use of easily memorized passwords without requiring the user to maintain a physical object comprising:

means for storing on the server a file associating each of a plurality of users with a different first key, means for transmitting, in response to an access by a particular user using a personal computer, to the personal computer an applet embedded in a web page requested by the access of the user's personal computer, said applet, when executed on the personal computer;

requesting the user to input a password, accessing a cookie, if present, on the user's personal computer and decrypting an encrypted first key stored in said cookie with the password to recover a first key related to the user, and using the first key to authenticate the user to the server and/or signing data transmitted to the server wherein the user may access the web server with a particular personal computer which already maintains a cookie in storage including a first key encrypted under said password, or in which the user may access the web server with another personal computer which does not yet maintain the cookie in storage, or in which the user may access the web server with a particular personal computer which already maintains a cookie in storage including a first key encrypted under said password but whereby that cookie somehow is lost or corrupted, said file stored on the server also including a migration secret, or a hash of a migration secret, said server further including means for authenticating the user on receipt of first information which favorably compares to the migration secret or the hash of the migration secret stored on the server or by means of an authentication protocol that demonstrates that the user knows the correct value of the migration secret, the server transmitting second information comprising an authentication key for the applet to store in the cookie encrypted with the password and to use subsequently to authenticate the user to the server or sign transaction data transmitted to the server on presentation of the password.

13. The system of claim 12 wherein the second information includes the first key encrypted under the password.

14. The system of claim 12 wherein the second information contains a second key, different from the first key, encrypted under the password, wherein the second key can be used instead of the first key by the applet to authenticate the user to the server.

15. The system of claim 12 wherein the means for transmitting the applet transmits the applet in one or more segments.

* * * * *